Patented July 20, 1954

2,684,296

UNITED STATES PATENT OFFICE 2,684,296

REDUCTION OF IRON ORES

Olav Möklebust, Hauge i Dalane, Norway, assignor to National Lead Company, New York, N. Y., a corporation of New Jersey No Drawing. Application September 20, 1951, Serial No. 247,568

Claims priority, application Norway March 8, 1951

3 Claims. (Cl. 75—33)

Reduction of ores at low temperature is usually carried out by heating the ore and the reducing agent to the temperature which is necessary for the reduction to take place. For iron ores the reduction temperature is generally between 600° C.–1200° C. and varies within these limits according to the quality of the ore, reducing agent, gaseous or solid reducing material, and the reducing conditions in general. When reducing iron ores with solid carbonaceous material, the reduction temperature is about 1000° C.

The ore which is subjected to reduction is usually gradually heated to the reduction temperature together with the reducing agent and/or in countercurrent to reducing gases. The degree of reduction at any time and temperature depends upon the reduction equilibrium between the components of the reaction.

When the material has attained the desired degree of reduction, the material must be removed from the zone and cooled in such a way and under such conditions that the reduced compounds are not reoxidized. This has previously been done by cooling the material in a neutral or reducing atmosphere or by indirect cooling by means of containers with cooling jackets.

These methods, however, have in common a poor or no utilization of the heat of cooling, as only a small part of this heat, and by some methods, no heat at all, can be conveyed back to and utilized directly in the reduction process.

As the heat of the reduced material leaving the reduction zone at about 1000° C. may correspond to about $\frac{1}{3}$ of the fuel consumption of the reduction process, the total fuel consumption would be reduced correspondingly by a reduction method which utilized this heat directly in the process.

The principal object of the present invention is to provide a process for reducing comminuted ore in which high reduction efficiency is obtained and in which the ore after reduction is cooled without reoxidation of the reduced iron. Another object is to provide such a process in which the heat in the reduced ore after reduction is conserved. Another object of the invention is to cool hot reduced iron ore in such manner as to conserve the heat values and at the same time prevent reoxidation of the reduced iron. A still further object is to provide a method for reducing iron ore in which superior efficiency from the fuel employed is obtained. These and other objects of this invention will be apparent from the following description thereof.

The present invention comprises covering a charge of comminuted ore admixed with a carbonaceous reducing agent with a layer of noncombustible oxidic material having a sintering temperature above the temperature employed during the heating to effect reduction. Towards the end of the reduction of the ore the temperature is raised so that the covering material sinters to form a layer which protects the charge from the oxidizing influence of the furnace atmosphere and also subsequent exposure to cooling gases, for instance, air. It is preferred to employ ore of the same composition as that in the charge but of substantially finer particle size as the protective layer material, the finer particle size resulting in a sintering temperature lower than that of the ore in the charge. The temperature of reduction is maintained below the sintering temperature of the charge ore and of the protective layer. Economical processing is obtained when air is employed for cooling the protected, reduced charge, thereby being preheated and is then used for combustion of fuel in the reduction zone of the furnace whereby heat values in the charge are conserved. The cooling air is preferably passed countercurrent to the charge in a tunnel furnace.

The procedure is illustrated by the following example:

Example

An iron ore of the following analysis:

| | Per cent |
|---|---|
| Iron (total Fe) | 36.8 |
| $SiO_2$ | 45.8 |
| Sulfur | .014 | and particle size up to 3 mm. was mixed with coke of size up to 3 mm. in the proportions 3:1 and fed into a tunnel furnace in kiln cars. For the purpose of desulfurization a desulfurizing agent, for instance, limestone may be added to the charge. The furnace comprised a pre-heating zone, a reduction zone and a cooling zone and was heated by means of an oil burner. In the reduction zone the temperature was maintained at about 1000° C. The combustion gases were oxidizing. The mixed material was placed on the kiln cars in a layer about 4" thick. An approximately $\frac{1}{2}$" thick layer of fine grained ore of size minus 20 mesh and of the same compositions as in the charge was sprinkled on top of the whole layer. The material was transported through the furnace with about 2 hours for heating in the pre-heating zone, about 2 hours in the reduction zone and about 1 hour in the cooling zone.

During the heating, moisture and other volatile components escaped from the charge through the porous covering layer without oxidizing combustion gases from the burner penetrating into the charge and consuming the carbon in the charge. In the reduction zone an intense evolution of CO gas from the charge took place. The strongly reducing gases escaped through the porous covering layer and were burnt in the oxidizing atmosphere above the covering layer.

Towards the end of the reduction zone where the temperature was somewhat higher than in the other part of the reduction zone, the covering layer sintered to a compact mass without the underlaying charge sintering.

The material subsequently passed into the cooling zone where it was cooled in a flow of air which was drawn in from the discharge end of the furnace by means of a fan in the chimney at the feed end. The cooling air was gradually heated and entered the reduction zone, where it served as combustion air for the burner gases.

When discharged from the furnace, the material had a temperature of about 100° C. The covering layer formed a continuous cake on top of the charge. It was brittle and was broken apart by slight pressure. The cooled charge and the pieces of the covering layer were screened to remove the pieces of the covering layer. The latter were crushed and returned to the process, this time as part of the charge. The underlaying charge was subjected to a separating process to remove unburnt coke and ashes. The reduced ore showed a degree of reduction of 92%. An analysis of the covering layer showed that a desulfurization of this material had taken place.

As shown in the example above, iron ore may be reduced with oxidizing atmosphere in the furnace according to the present invention. The process is operated so that the ore undergoing reduction is not agitated and may, for instance, be carried out in a common tunnel furnace or a bogie-type furnace. As an oxidizing atmosphere can be employed a better utilization of the fuel is attained, the material going in cold and coming out very much cooled and substantially less heat is consumed than by typical reduction furnaces where the material comes out hot.

By conducting the reduction in for instance a tunnel furnace according to the present invention, other substantial advantages over the usual reduction methods are gained. A higher degree of reduction of the reduced product is achieved, the degree of reduction being essentially a function of the temperature under the conditions described in the example; while by other methods as, for instance, by reduction in rotary furnaces, the degree of reduction is limited by the tendency of the material to sinter and stick to the walls of the apparatus. In rotary furnaces and shaft furnaces the dust losses of ore and coke are considerable factors both in the production and construction of the plant. According to the present invention there is practically no dust loss as the covering layer prevents dust from coke and ore from getting out of the charge.

In the present process the particle size of the ore is immaterial. Even very fine grained ore which cannot be reduced in rotary furnaces and shaft furnaces on account of sintering trouble, too high dust losses and too poor gas passage, may be processed according to the present invention in furnaces as, for instance, tunnel furnaces by appropriate adjustment of operating conditions.

As for the type and nature of the covering layer, a substantially finer grained ore of the same quality as the ore under reduction was used in the above example. The particle size of the ore of the covering layer was in this instance minus 20 mesh which is substantially finer than minus 3 mm. particle size of the ore being reduced. The finer the grains of the covering ore, the more compact the covering layer will be before the actual sintering begins, and the sooner the more compact the covering layer will be be- also depends on the chemical composition of the ore, temperature and time. The particle size of the covering layer must therefore be adjusted according to these factors for each quality of ore, in order that the gases may escape through the covering layer during the preheating and reduction without the oxidizing atmosphere coming in and so that the covering layer after the reduction is ended, will be sufficiently compact during the cooling.

In cases where the ore itself can not be used as a covering layer, other materials may be employed which have the necessary characteristics as described above or compounds promoting sintering or formation of slag may be added to the covering layer. Thus the covering layer may be formed of, in addition to fine ore, other siliceous material such as sand, or clay. If desired or necessary to obtain correct sintering conditions fluxes such as alkali, sodium carbonate or lime may be admixed with the covering layer material.

In the above example the thickness of the charge in the furnace was about 4 inches. The thickness of the layer may also be greater, for instance 16 inches; the time of the passage through the furnace will thereby be proportionally longer. The thickness of the covering layer was about ½ inch. This thickness may also be varied and depends on the particle size of the ore. With a thicker covering layer, however, the heat transfer from the furnace gases to the charge will be poorer.

The degree of reduction of 92% which was attained in the example, may be varied by adjusting the temperature. At a slightly (10° C.) higher temperature than that employed in the example the degree of reduction may be as high as 95–100%.

A high degree of reduction is of great importance in pure iron ore concentrates which are intended for smelting after the reduction treatment. In crude iron ores a high degree of reduction is also very important as these by crushing and magnetic separation after the reduction treatment will give correspondingly greater iron yields.

Agglomerated products as for instance sinter, pellets etc., may also be reduced according to the described procedure. Other ores and compounds than iron ores, the reduction temperature of which are in the working range of usual furnaces and construction materials, may also be treated according to the present procedure.

While this invention has been described and illustrated by the example shown, it is not intended to be strictly limited thereto and other modifications and variations may be employed within the scope of the following claims.

I claim:

1. In a process in which comminuted iron ore is admixed with a carbonaceous reducing agent, heated at a temperature between 600° C. and 1200° C. to effect reduction without agitation of the charge and subsequently cooled by exposure to cooling gases, the steps which comprise covering the charge before reduction with a layer of non-combustible oxidic material, said material having a sintering temperature above the reduction temperature employed, but below the sintering temperature of the admixture of reducing agent and ore, said oxidic material being composed of ore of the same composition as the charge and being of substantially finer particle size, thereby to form a sintered protective layer over said charge which is retained in comminuted form after reduction and during subsequent exposure to cooling gases, and after cooling, separating said sintered protective layer from the so-reduced ore.

2. Method according to claim 1 in which the particle size of the oxidic material is minus 20 mesh.

3. Method according to claim 2 in which the thickness of the protective layer is about ½ inch.

References Cited in the file of this patent

UNITED STATES PATENTS

| Number | Name | Date |
| --- | --- | --- |
| 2,352,316 | Goetzel | June 27, 1944 |

FOREIGN PATENTS

| Number | Country | Date |
| --- | --- | --- |
| 1,869 | Great Britain | of 1792 |